US012791427B2

(12) United States Patent
Eguchi

(10) Patent No.: US 12,791,427 B2
(45) Date of Patent: Nov. 10, 2026

(54) APPARATUS, METHOD, AND STORAGE MEDIUM

(71) Applicant: CANON KABUSHIKI KAISHA, Tokyo (JP)

(72) Inventor: Akira Eguchi, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 133 days.

(21) Appl. No.: 18/966,764

(22) Filed: Dec. 3, 2024

(65) Prior Publication Data

US 2025/0180430 A1 Jun. 5, 2025

(30) Foreign Application Priority Data

Dec. 5, 2023 (JP) ................................ 2023-205718

(51) Int. Cl.
*G01M 11/02* (2006.01)

(52) U.S. Cl.
CPC .... *G01M 11/0257* (2013.01); *G01M 11/0207* (2013.01)

(58) Field of Classification Search
CPC ...................... G01M 11/0257; G01M 11/0207
See application file for complete search history.

(56) References Cited

U.S. PATENT DOCUMENTS 3,904,294 A * 9/1975 Gold .................. G01M 11/0285 356/124.5
5,801,822 A * 9/1998 Lafferty ............. G01M 11/0278 356/124
2007/0115457 A1* 5/2007 Matsuzawa ........ G01M 11/0264 356/124
2020/0116589 A1* 4/2020 Eguchi ............... G01M 11/0264

FOREIGN PATENT DOCUMENTS

JP 2020060469 A 4/2020

* cited by examiner

*Primary Examiner* — Michael A Lyons
*Assistant Examiner* — Jarreas Underwood
(74) *Attorney, Agent, or Firm* — Canon U.S.A., Inc. IP Division

(57) ABSTRACT

An apparatus includes a light source unit including a first light source and a second light source that illuminate an optical system, and an estimation unit for estimating an aberration of the optical system based on respective light intensity distributions of the first and second light sources, the light intensity distributions having been obtained via the optical system. The first and second light sources are different from each other in positions in an axis direction of the optical system and in a direction perpendicular to the optical axis direction.

20 Claims, 12 Drawing Sheets

APPARATUS, METHOD, AND STORAGE MEDIUM

BACKGROUND

Technical Field

The present disclosure relates to an estimation apparatus and an estimation method that use light intensity distributions to estimate an aberration of an optical system, and a storage medium.

Description of the Related Art

To evaluate and guarantee performance of an optical apparatus, an aberration of an optical system of an optical apparatus, such as a camera and a telescope, is estimated. In order to estimate the aberration of the optical system, a method is known in which light is irradiated to the optical system and light intensity distributions are obtained via the optical system.

Japanese Patent Application Laid-Open No. 2020-60469 discusses a method of using a driving device to drive a sensor and an optical system to acquire light intensity distributions at a plurality of defocus positions and obtain an aberration based on a plurality of light intensity distributions.

SUMMARY

According to an aspect of the embodiments, an apparatus includes a light source unit including a first light source and a second light source that are configured to illuminate an optical system, and an estimation unit configured to estimate an aberration of the optical system based on respective light intensity distributions of the first light source and the second light source obtained via the optical system. A position of a first light source and a position of the second light source are different from each other in an axis direction of the system and in a direction perpendicular to the optical axis direction.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings. In each drawing, an identical member is denoted by an identical reference number, and an overlapping description is omitted.

Figure 1:
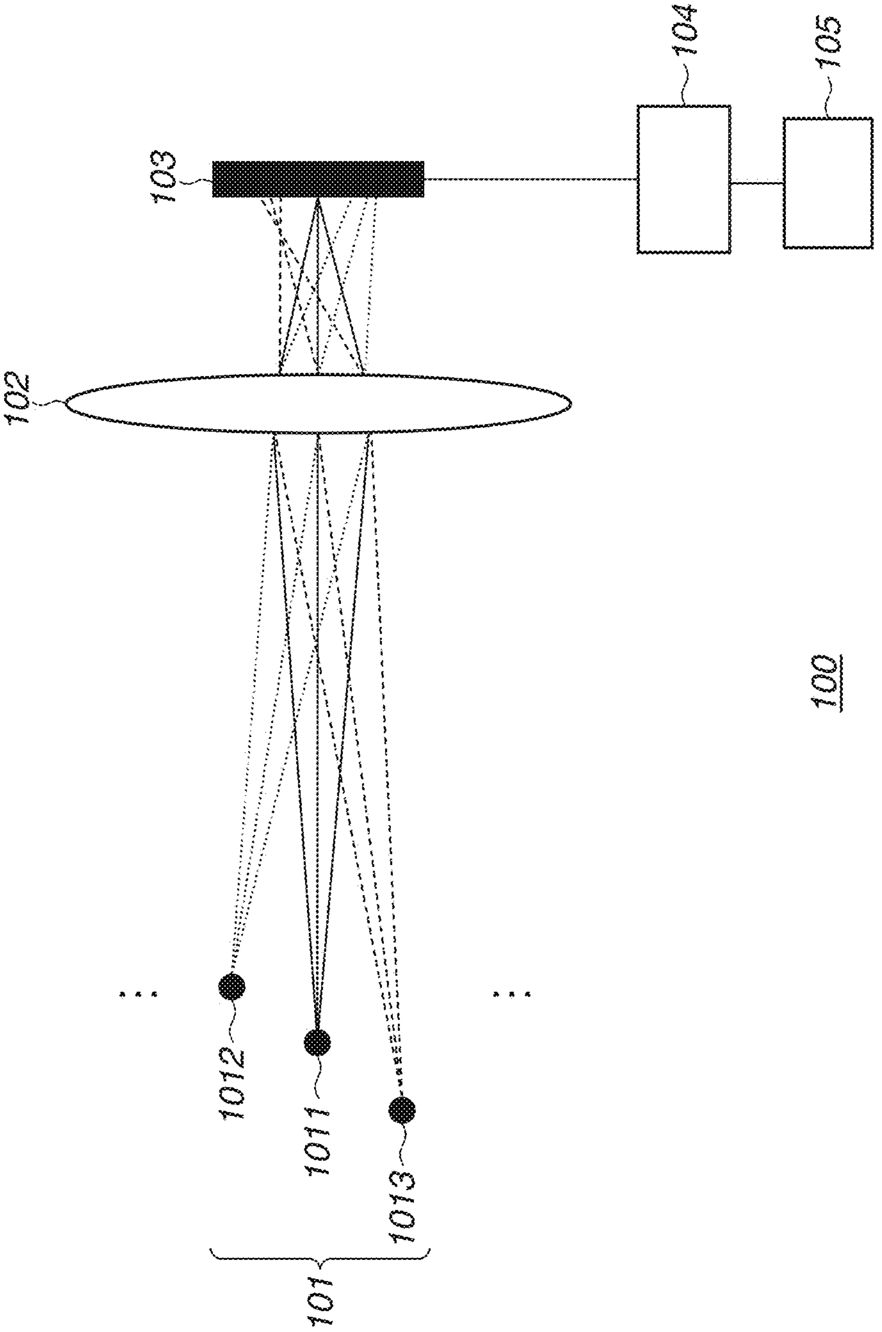
FIG. 1 is a schematic diagram illustrating an aberration estimation apparatus according to an exemplary embodiment of the disclosure.

FIG. 1 is a schematic diagram illustrating an aberration estimation apparatus 100 according to an exemplary embodiment of the disclosure. The aberration estimation apparatus 100 according to the present exemplary embodiment includes a light source unit 101, an image pickup element 103, a computer 104, and a display unit 105, and measures (estimates) a wavefront aberration of an optical system 102 to be inspected (hereinafter, simply referred to as "optical system 102").

Here, the optical system 102 may be an optical system alone as a measurement target, or a combination of the optical system as the measurement target and the image pickup element 103. For example, in a case where the measurement target is a camera lens or a telescope, the optical system 102 is the camera lens or the telescope itself. Alternatively, the measurement target may be an element or an apparatus in which an optical system and an image pickup element are integrated like a camera for a mobile phone.

Light emitted from the light source unit 101 is focused to form an image on the image pickup element 103 by the optical system 102, and an optical image is thereby formed. The image pickup element 103 acquires a light intensity distribution of the optical image formed by the optical system 102. Examples of the image pickup element 103 include a charge-coupled device (CCD) sensor and a complementary metal-oxide semiconductor (CMOS) sensor.

As a modification of the present exemplary embodiment, an image pickup element included in the measurement target may be used to acquire light intensity distributions of a plurality of light sources via the optical system 102. In this case, the image pickup element 103 in the aberration estimation apparatus 100 is not essential. In this case, at least the computer 104 is communicably connected to exchange information regarding light intensity distributions obtained by the image pickup element included in the measurement target. A communication means may be implemented in a wired manner or a wireless manner.

The computer 104 executes estimation calculation on the acquired light intensity distributions to estimate an aberration of the optical system 102. The computer 104 includes a control means for controlling the image pickup element 103. The computer 104 also includes a calculation means to perform estimation calculation on the light intensity distributions acquired by the image pickup element 103.

The control means and the calculation means (estimation unit) may be included in one computer or may be individual devices. For example, a server existing on the cloud may execute estimation calculation via a network as a calculation device. The acquired light intensity distributions may be saved by the computer 104 or a data holding device, which is not illustrated.

The display unit 105 is, for example, a liquid crystal display or a projector. The display unit 105 displays the acquired aberration and the like.

The optical system 102 may be evaluated or adjusted with the acquired aberration as appropriate.

The present exemplary embodiment can be mathematically modeled and can thereby be implemented as software functions of a computer system. The software functions of the computer system described herein include programing (a program) having executable codes. The software codes are executable by a general-purpose computer. The codes or relevant data is stored in a general-purpose computer platform during the operation of the software codes. However, in other cases, software is stored in another location or loaded to an appropriate general-purpose computer system. Thus, the software codes can be held in one or more module forms in at least one machine-readable medium (storage medium).

The light source unit 101 includes a plurality of light sources and illuminates the optical system 102. Each light source in the present exemplary embodiment is a point light source. The point light source is an element from which light diffuses from a micro region, and a member having a micro hole such as a pinhole may be used. An end portion of an optical fiber functions as the point light source. A micro white circle drawn on a black planar substrate or fine luminescent coating may be used. In this case, there is an independent illumination source that illuminates the substrate, but a scatterer or light emitter described above can also be regarded as a light source.

A light emission region (emission surface) of the light source may not be a point in a precise sense. Since an image formed by the optical system 102 has a spread due to a diffraction limit or an aberration of the optical system 102, the size of a geometric optical image formed by the light source may be smaller than a wave-optical spread. A specific member of the light source is not limited to the above-described examples, and is to be an element in which emission and scattering of light is performed in a micro region. The center of the light source in each exemplary embodiment means the center of a light emission surface.

The light source unit 101 in the aberration estimation apparatus 100 in FIG. 1 includes a light source (first light source) 1011, a light source (second light source) 1012, and a light source (third light source) 1013. The light source 1012 and the light source 1013 are different from the light source 1011 in positions in an optical axis direction of the optical system 102 and in a direction perpendicular to the optical axis direction. That is, the light sources 1011, 1012, and 1013 are arranged at different object heights and different defocusing positions. The light source 1011 in FIG. 1 is positioned on the optical axis of the optical system 102. At the time of measurement, in one embodiment, the optical system 102 is arranged such that light emitted from any one of point light sources is focused on the image pickup element (light receiving unit) 103. In other words, the light source 1011 and the image pickup element 103 have a conjugate relationship by the optical system 102.

In the following description, a light source having a conjugate relationship with the image pickup element 103 by the optical system 102 is referred to as a reference light source. Light sources other than the reference light source are referred to as peripheral light sources. In FIG. 1, the light source 1011 serving as the reference light source is positioned on the optical axis of the optical system 102, but the position of the reference light source is not limited thereto. The position of the reference light source according to the present exemplary embodiment is at a point on a conjugate plane having a conjugate relationship with the image pickup element 103 by the optical system 102. However, the reference light source may not be in the conjugate relationship in a precise sense, and may be in a state of being defocused to some extent. A shift in the arrangement of the reference light source is permitted in such a range as that is not departing from an imaging state in which the optical system 102 is to be evaluated.

There are two types of defocusing. The first type is object-side defocusing representing a shift between an in-focus position and an object (subject) in the optical axis direction. The second type is image-side defocusing representing a shift between the light receiving unit (image pickup element) 103 and a focused image in the optical axis direction. While the following description will be given by differentiating the object-side defocusing and the image-side defocusing from each other for clarity of explanation, a condition regarding the object-side defocusing can be converted into a condition regarding the image-side defocusing, and vice versa. In a case where it is simply expressed as defocusing, it means a state where the image is shifted with respect to the position of the image pickup element 103 in the optical axis direction, and a cause thereof is not specified.

A peripheral light source group includes at least one or more of light sources. Although FIG. 1 illustrates only the light sources 1012 and 1013, the number of light sources included in the peripheral light source group is not limited to two. Each light source of the peripheral light source group and the reference light source are arranged such that respective positions in the optical axis direction and in the direction perpendicular to the optical axis direction are different from each other. As a result, an image focused by each light source in the peripheral light source group is different in image height and image-side defocusing from an image formed by the reference light source due to the optical system 102. With such a configuration, it is possible to acquire a plurality of point images that are defocused differently from each other without using a driving device. Hence, the aberration of the optical system is estimated in a short period of time with high accuracy based on a plurality of light intensity distributions.

Additionally, in one embodiment, the light sources of the peripheral light source group are arranged on the object side of the reference light source (at a position far from the image pickup element 103) and the image side of the reference light source (at a position near the image pickup element 103), respectively. With such a configuration, it is possible to acquire light intensity distributions in which defocusing is made by negative and positive defocusing amounts. As a result, it is possible to estimate an aberration of the optical system 102 with high accuracy. For example, as illustrated in FIG. 1, the light source 1012 is arranged at a position nearer to the image pickup element 103 than that of the reference light source, and the light source 1013 is arranged at a position farther from the image pickup element 103 than that of the reference light source. In the following description, assume that defocusing from the object side to the image side is positive defocusing.

Furthermore, the peripheral light source group is composed of two or more light sources. In one embodiment, the respective positions of the light sources are to be different from each other in the optical axis direction of the optical system 102 and in the direction perpendicular to the optical axis direction. Light intensity distributions of a plurality of optical images formed by such a peripheral light source group are acquired, whereby the accuracy of estimation calculation can be increased.

Figure 2:
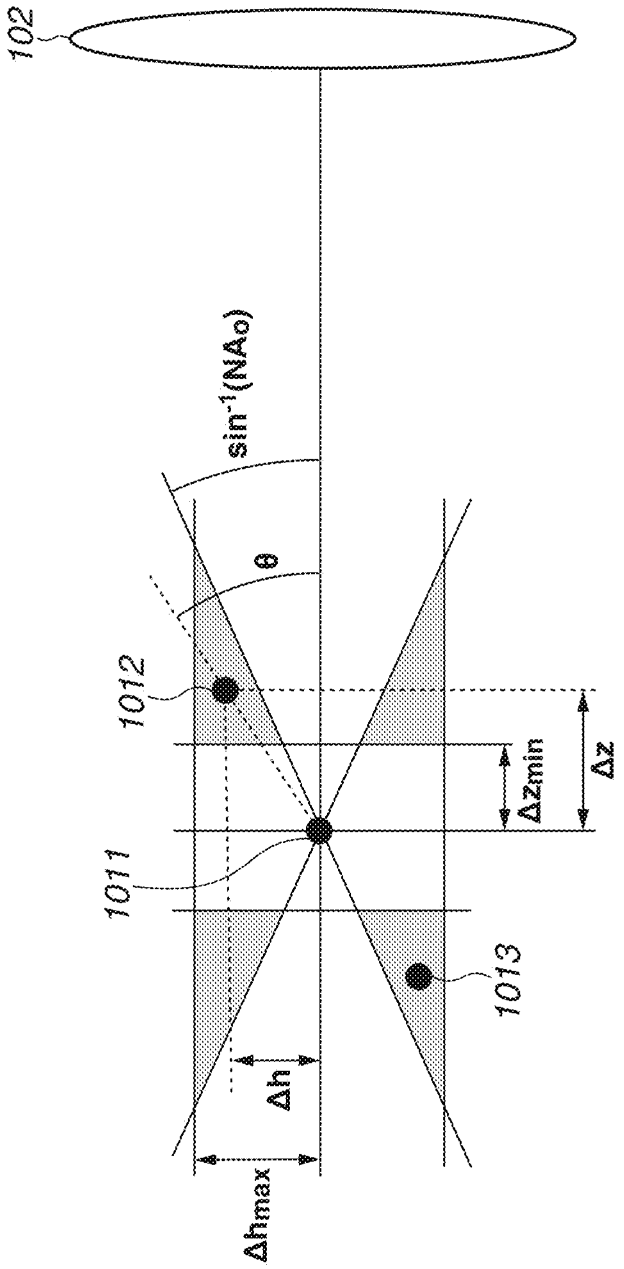
FIG. 2 is a diagram illustrating arrangement of a plurality of light sources.

Details of the arrangement of the light sources of the light source unit 101 according to the present exemplary embodiment will be described with reference to FIG. 2. FIG. 2 is a cross-sectional view including the optical axis of the optical system 102 and the reference light source (light source 1011). A region expressed in gray in FIG. 2 is a region that satisfies the following Conditional Expressions (1) to (4). The plurality of light sources of the light source unit 101 according to each exemplary embodiment is arranged at positions that satisfy one or more of the following Conditional Expressions (1) to (4).

FIG. 2 illustrates only a cross section that passes through the optical axis, but a space obtained by rotation of a gray region in FIG. 2 about the optical axis as a rotation axis is actually a region that satisfies Conditional Expressions (1) to (4). In the present exemplary embodiment, the light source 1011 arranged on the optical axis serves as a reference, but the configuration is not limited thereto. By arranging the light sources so as to satisfy the above-mentioned Conditional Expressions with a freely selected light source arranged outside the optical axis serving as a reference, it is possible to produce respective effects.

Since images formed by the light sources arranged within a depth of field range of the optical system 102 can be regarded as having substantially identical shapes, each light source is arranged at a position to be defocused by an interval corresponding to an object-side defocusing amount, which is larger than the depth of field range of the optical system 102.

When an object-side numerical aperture of the optical system 102 is NAo and a wavelength of a light source is λ [nm] according to the wave-optical imaging theory, a depth of field (DOF) of the optical system 102 is expressed by Expression 1.

$$DOF=\lambda/NAo^2 \quad \text{[Expression 1]}$$

To arrange each light source at a position to be defocused by an interval corresponding to an object-side defocusing amount Df [mm] that is larger than the depth of field range of the optical system 102, the following Conditional Expression (1) is satisfied:

$$1/Nao^2 \leq |\Delta z\text{min}|/\lambda, \quad (1)$$

where Δzmin [mm] is a minimum amount of a distance between the centers of light sources in the optical axis direction.

The object side numerical aperture NAo can be obtained by NAo=½FM with use of an F-number of the optical system 102 and a reduction ratio M of the optical system 102. The following description is on the premise of F-numbers being about 1 to 8, which are typically used in a photographic lens.

For example, since a wide-angle lens has a reduction ratio of approximately 50, the Conditional Expression (1a) to estimate an aberration of the wide-angle lens is satisfied.

$$640000 \leq |\Delta z\text{min}|/\lambda \quad (1a)$$

Since a photographic lens, which has a standard focal length used for capturing an image of a human figure and the like, has a reduction ratio of approximately 30, in one embodiment, the below Conditional Expression (1b) to estimate an aberration of the photographic lens having the standard focal length is satisfied.

$$230000 \leq |\Delta z\text{min}|/\lambda \quad (1b)$$

Since a telephoto lens or the like has a reduction ratio as small as about five, the Conditional Expression (1c) to estimate an aberration of the telephoto lens is satisfied.

$$6400 \leq |\Delta z\text{min}|/\lambda \quad (1c)$$

However, when Δzmin becomes too large, the aberration estimation apparatus 100 grows in size. Hence, it is to set 1000 mm≤|Δzmin|. For this reason, in order to support an optical system with a wide wavelength range without increasing the size of the aberration estimation apparatus 100, the plurality of light sources of the light source unit 101 preferably satisfies Conditional Expression (1b) rather than Conditional Expression (1a), and more preferably satisfies Conditional Expression (1C) rather than Conditional Expression (1b).

Subsequently, to avoid overlapping of a plurality of point images, the light sources are preferably arranged to be separate from each other so as to have an object height larger than a spread due to defocusing of each point image. A spread angle of the point image is expressed by $\sin^{-1}$(NAo) in terms of an object space. Hence, in geometric arrangement illustrated in FIG. 2, an angle θ[°] formed between a straight line connecting centers of freely selected two light sources and the optical axis is expressed by Expression 2-1.

$$\sin^{-1}(NAo) \leq \theta \leq 180° - \sin^{-1}(NAo) \quad \text{[Expression 2-1]}$$

When this condition is satisfied, it is possible to prevent overlapping of a plurality of light sources. To estimate an aberration with high accuracy, the point images are preferably separate from each other, but may not be separate from each other in a precise sense and may be partially overlapped with each other. For example, the disclosure functions even if there is an overlap of approximately 10% between the point images. This is expressed by the following Expression 2-2.

$$0.9\sin^{-1}(NAo) \leq \theta \leq 180° - 0.9\sin^{-1}(NAo) \quad \text{[Expression 2-2]}$$

Assuming a general photographic lens with a reduction ratio of approximately five and an F-number of one or more, the following Conditional Expression (2) is satisfied.

$$5.2 \leq \theta \leq 174.8 \quad (2)$$

By arranging the plurality of light sources so as to satisfy Conditional Expression (2), it is possible to spatially separate the respective point images formed by the plurality of light sources. As a result, imaging is performed by turning-on of the plurality of light sources once, whereby it becomes possible to collectively acquire the plurality of point images with different defocusing amounts. With such a configuration, there is no need for performing processing of separating the plurality of point images, and it is possible to shorten time of estimation processing.

In a case where the plurality of light sources is arranged at different object heights, the influence of vignetting is different depending on an object height so that different light intensity distributions are acquired. For example, when a pupil function of a point image is used to estimate the aberration, it is on the premise that a shape expressed by the pupil function of the point image and a shape expressed by a pupil function of an actual point image are matched with each other, vignetting to be used in estimation is different from actual vignetting of the optical system, and an error occurs in the estimation of the aberration. Hence, it is to reduce the influence of the vignetting to satisfy desired estimation accuracy.

When the desired estimation accuracy is δ0, a difference between the object height of the reference light source 1011 and the object height of the peripheral light source is Δh, an amount of vignetting that changes depending on Δh is Δr, an amount of an estimation error caused at this time is expressed by Expression 3.

$$\delta(\Delta r(\Delta h)) \leq \delta 0 \quad \text{[Expression 3]}$$

Figure 3:
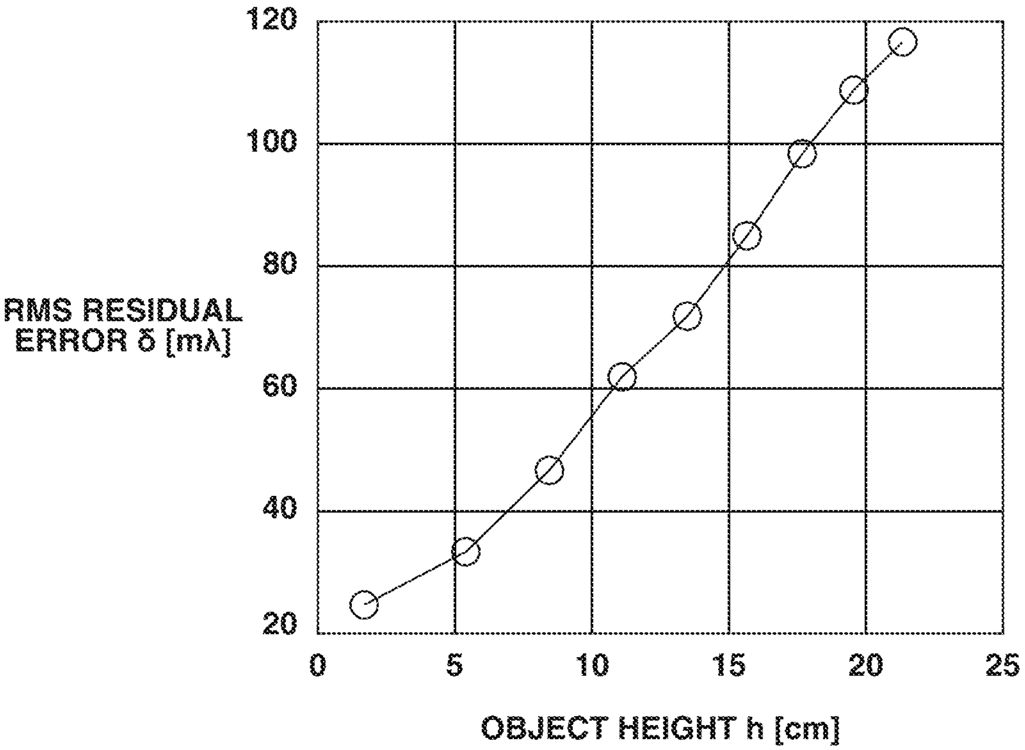
FIG. 3 is a graph indicating a relationship between an object height and an estimation error.

A relationship between the object height and the estimation error in the present exemplary embodiment will be described with reference to FIG. 3. FIG. 3 is a graph indicating a relationship between the object height and the estimation error. FIG. 3 indicates an estimation error δ(h) that is caused when an object height h of a light source of the peripheral light source group to be installed is changed in the present exemplary embodiment. A vertical axis in FIG. 3 indicates a root-mean-square (RMS) residual error obtained by use of the RMS, and a horizontal axis indicates the object height h [cm].

As the object height h in FIG. 3 increases, the vignetting that is caused by the optical system 102 increases. As a result, the larger the object height, the larger the estimation error. Generally, as one index for accuracy in estimating the aberration, the estimation error δ is desired to be 100 mλ or less. Hence, the object height in the present exemplary embodiment is preferably 180 mm or less. Furthermore, since the present exemplary embodiment is on the premise of an imaging magnification of 20, the object height is preferably 9M [mm] or less when expressed by a function of an imaging magnification M. In a case where the optical system to which the aberration estimation apparatus 100 according to the present exemplary embodiment is applied has a reduction ratio of 100 or less (M≤100), the object height is preferably 900 mm or less. In a case where the aberration is estimated with high accuracy, the object height is preferably 270 mm or less.

Based on the above, when a maximum difference between the object height of the reference light source 1011 that satisfies the above-mentioned Expression 3 and the object height of the peripheral light source is Δhmax, Conditional Expression (3) is satisfied.

$$900\ \text{mm} \geq \Delta h\text{max} \quad (3)$$

By arranging the plurality of light sources to satisfy Conditional Expression (3), it is possible to reduce the influence of the vignetting sufficiently, whereby it is possible to acquire the aberration in the optical system 102 with high accuracy.

Since the plurality of light sources is arranged at different object heights in the present exemplary embodiment, an aberration of light from each light source and an aberration in a point image obtained from light from the reference light source are different from each other. Since aberrations in point images obtained from the respective light sources are different from each other, an aberration estimated from light intensity distributions based on the point images formed by the respective light sources has an error from a true aberration. The arrangement to reduce this error will now be described.

In a case where the aberration of the optical system 102 with respect to the reference light source is estimated, assume that an amount of a difference between an aberration in each point image formed by a light source of the peripheral light source group and an aberration in a point image formed by the reference light source is a variation in aberration. In a case where there is the variation in aberration, the light sources are preferably arranged such that signs of variations in aberrations are different from each other to estimate the aberration in the point image formed by the reference light source with high accuracy. With such a configuration, it is possible to reduce the estimation error caused by the influence of the variation in aberration caused by the object height.

A description is now given of a sign of a variation in wavefront aberration and the arrangement of the light sources.

For example, a variation in coma aberration is approximately proportional to the object height h, and a variation in astigmatic aberration is approximately proportional to a square of the object height h. The following description will be given of the arrangement of the plurality of light sources to reduce the influence of the variation in aberration due to the object height on the light intensity distribution.

Figure 4:
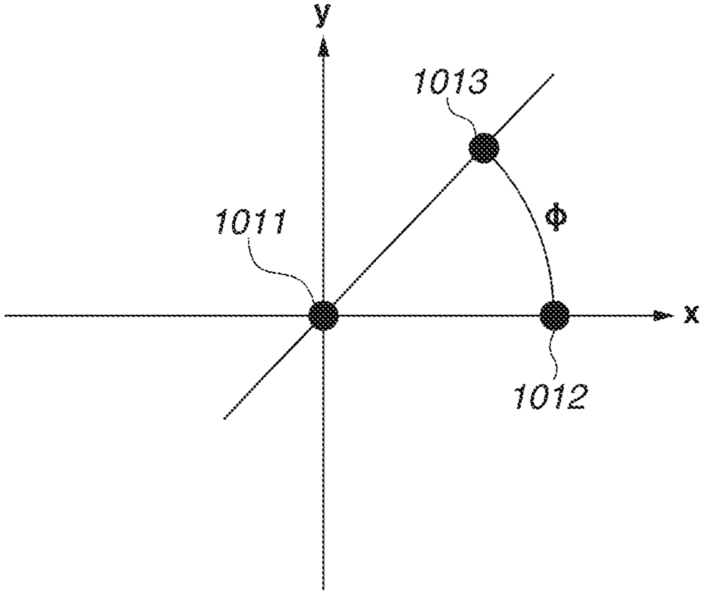
FIG. 4 is a diagram illustrating arrangement of the plurality of light sources.

Generalization to a high-order aberration will now be described with reference to FIG. 4. FIG. 4 is a diagram illustrating that the respective positions of the light sources are projected on a plane that passes through the reference light source 1011 and that is perpendicular to the optical axis.

In FIG. 4, the light source 1012 is installed at a positive position of an x-axis, and the light source 1013 is installed at a position rotated by an angle q from the x-axis about the optical axis (reference light source 1011). The description will be given using a relationship between a wavefront aberration (a first wavefront aberration) in the point image formed via the optical system 102 with light emitted from the light source 1012 and a wavefront aberration (a second wavefront aberration) in the point image formed via the optical system 102 with light emitted from the light source 1013. The position of the light source 1012 in FIG. 4 is not limited to the position on the x-axis. The angle φ in the present exemplary embodiment may be expressed by an angle formed between a line segment that connects the position of the light source 1012 and the position on the optical axis and a line segment that connects the position of the light source 1013 and the position on the optical axis.

If a difference in object height between the reference light source 1011 and the peripheral light source is sufficiently small, the variation in the second wavefront aberration corresponds to a wavefront aberration that is rotated from the first wavefront aberration by φ.

Figure 5:
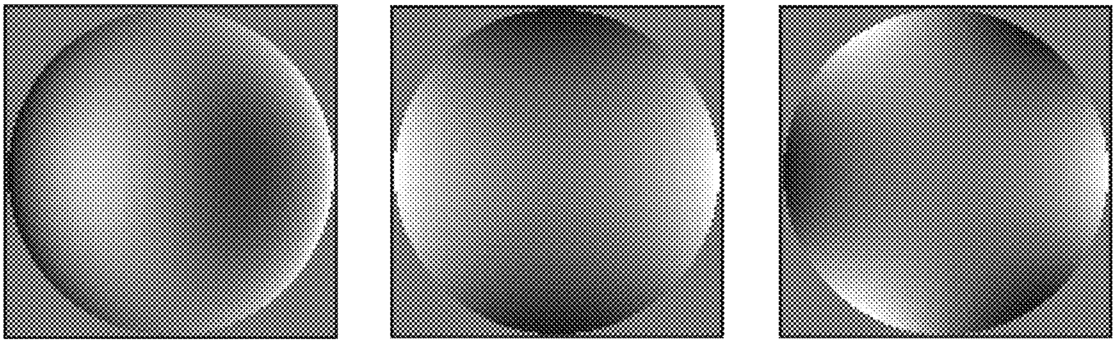
FIG. 5 illustrates diagrams each illustrating an example of a wavefront aberration.

Next, arrangement of the light sources will be described with reference to FIG. 5. FIG. 5 illustrates views each illustrating an example of a wavefront aberration.

A wavefront aberration representing a coma aberration illustrated in FIG. 5 left is an aberration in which a sign of a variation is inverted at every rotation of 180°. For this reason, by arranging the light source 1012 and the light source 1013 at positions that are rotated by approximately 180° about the optical axis, it is possible to acquire wavefront aberrations with different signs of variations in coma aberration.

A wavefront aberration representing an astigmatic aberration illustrated in FIG. 5 middle is an aberration in which a sign of a variation is inverted at every rotation of 90°. For this reason, by arranging the light source 1012 and the light source 1013 at positions that are rotated by approximately 90° about the optical axis, it is possible to acquire wavefront aberrations with different signs of variations in astigmatic aberration.

A wavefront aberration representing an astigmatic aberration illustrated in FIG. 5 right is an aberration in which a sign of a variation is inverted at every rotation of 60°. For this reason, by arranging the light source 1012 and the light source 1013 at positions that are rotated by approximately 60° about the optical axis, it is possible to acquire wavefront aberrations with different signs of variations in coma aberration.

To reduce the influence of the high-order aberration with high accuracy, in one embodiment, the light sources is to be arranged at every angle of smaller degrees. For example, the peripheral light sources are arranged at positions each rotated by approximately 90°, whereby it is possible to reduce not only the influence by the astigmatic aberration in which the sign of the variation is inverted at every rotation of 90°, but also the influence by the coma aberration in which the sign of the variation is inverted at every rotation of 180° with high accuracy. It is also possible to reduce the influence by a high-order coma aberration represented by the 14th and 15th terms of Fringe Zernike polynomials.

The peripheral light sources are arranged at positions each rotated by approximately 45° about the optical axis, whereby it is possible to suppress the influence by an aberration in which a sign of a variation is changed at rotation of 45° represented by the 17th term of Fringe Zernike polynomials. In the high-order astigmatic aberration represented by the tenth term of Fringe Zernike polynomials illustrated in FIG. 5 right, a sign of a variation is not changed at every rotation of 45°. However, by arranging the light sources at different angles, a variation in aberration generated in each point image is distributed to a component in the tenth term and a component in the eleventh term. Even if the sign of the variation in wavefront aberration is not simply changed, but if the light sources are arranged such that variations in aberration are different between a plurality of acquired point images, it is possible to reduce an estimation error due to an averaging effect. For this reason, calculation is performed with use of point images formed by the light sources arranged at a plurality of angles, whereby the estimation accuracy can be increased.

Furthermore, by arranging the peripheral light sources at positions each rotated by approximately 60° about the optical axis, it is possible to reduce the influence by the astigmatic aberration in which the sign of the variation is inverted at every rotation of 60° with high accuracy. By arranging the peripheral light sources at positions each rotated by approximately 30°, it is possible to reduce the influence by the astigmatic aberration or the like with higher accuracy.

In the present exemplary embodiment, an amount of rotation is every 360/n° (n is an integer), but is not limited thereto. Even if the light sources are not arranged at every 360/n° in a precise sense, it is possible to reduce the estimation error due to the averaging effect. Even in a case where the number of light sources to be arranged is small, by arranging at least two light sources out of a plurality of light sources at an angle φ of 30° or more, it is possible to obtain the above-mentioned effect.

Here, when an angle between a line segment that connects the light source 1012 and the optical axis of the optical system 102 and a line segment that connects the light source 1013 and the optical axis of the optical system 102 is φ[°], Conditional Expression (4) is satisfied.

$$30° \le \varphi \tag{4}$$

By arranging the plurality of light sources to satisfy Conditional Expression (4), it is possible to spatially separate the respective point images formed by the plurality of light sources. As a result, by turning ON the plurality of light sources once to perform imaging, it is possible to collectively acquire the plurality of point images with different defocusing amounts. With such a configuration, there is no need for performing processing of separating the plurality of point images, and it is possible to shorten time of estimation processing.

Preferred exemplary embodiments of the disclosure will be described in detail below.

Figure 6:
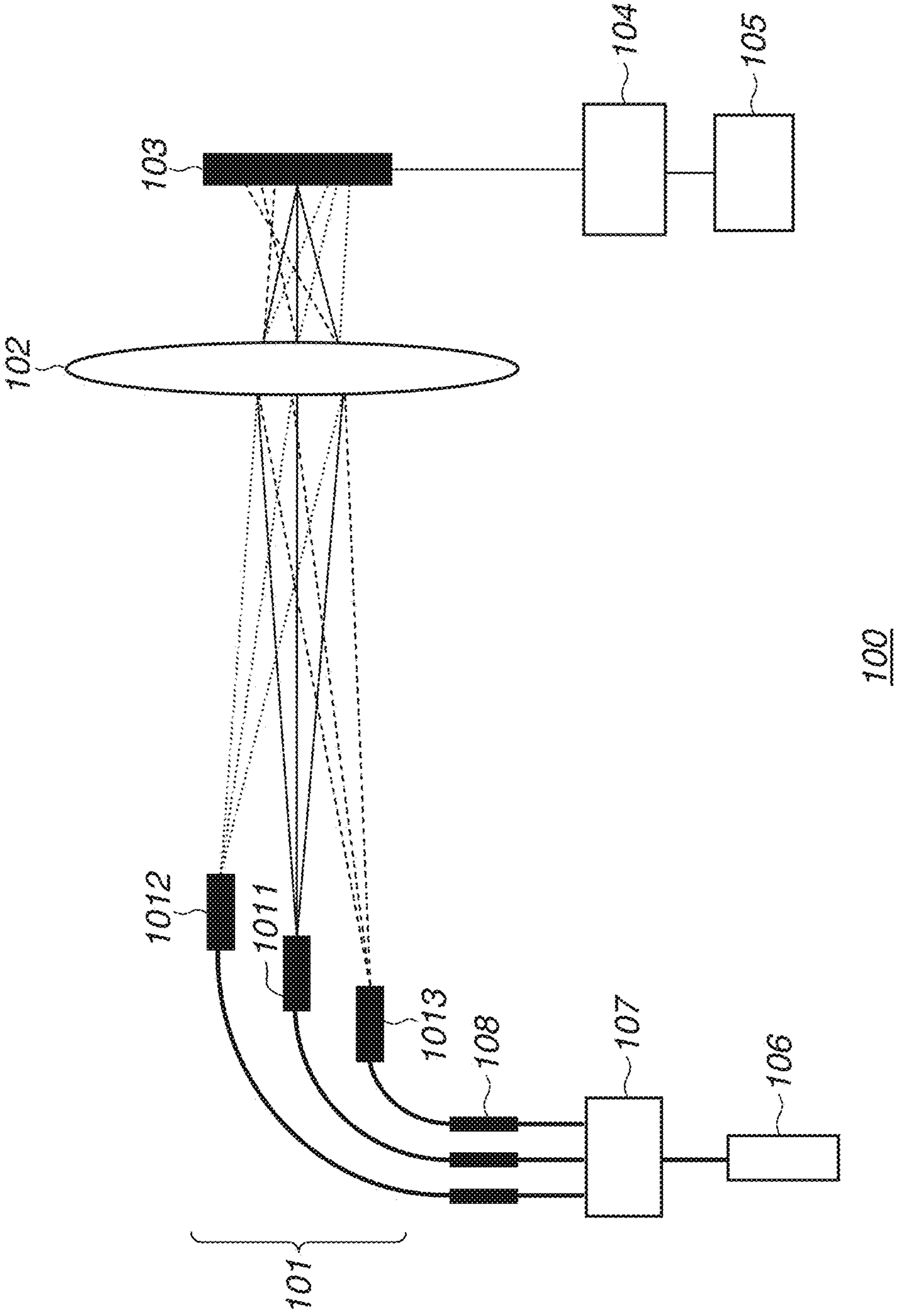
FIG. 6 is a schematic diagram of the aberration estimation apparatus according to a first exemplary embodiment.

The aberration estimation apparatus 100 according to a first exemplary embodiment is now described with reference to FIG. 6.

The light source unit 101 according to the present exemplary embodiment includes a laser light source 106, a fiber branch element 107, light amount adjustment elements 108, and end surfaces of three optical fibers. Light emitted from the laser light source 106 is guided to the fiber branch element 107 by the optical fibers. Light emitted from the laser light source 106 in the present exemplary embodiment is assumed to have a wavelength of approximately 524 nm. The fiber branch element 107 divides light for three optical fibers. The three optical fibers include the respective light amount adjustment elements 108 for adjusting a light amount. The respective end surfaces of the three optical fibers correspond to the light sources 1011, 1012, and 1013 in the present exemplary embodiment.

In the present exemplary embodiment, the light source 1011 is the reference light source, and is installed on the optical axis. The light sources 1012 and 1013 are installed such that the positions thereof are different from each other with respect to the reference light source in the optical axis direction of the optical system 102 and in the direction perpendicular to the optical axis direction. In the present exemplary embodiment, object heights of the light sources of the peripheral light source group (the light sources 1012 and 1013) are 2 cm and −2 cm, respectively, and amounts of object-side defocusing are 10 cm and −10 cm, respectively. In the present exemplary embodiment, light emitted from the light source unit 101 is reduced by 20 times to focus an image on the image pickup element 103 by the optical system 102.

Figure 7:
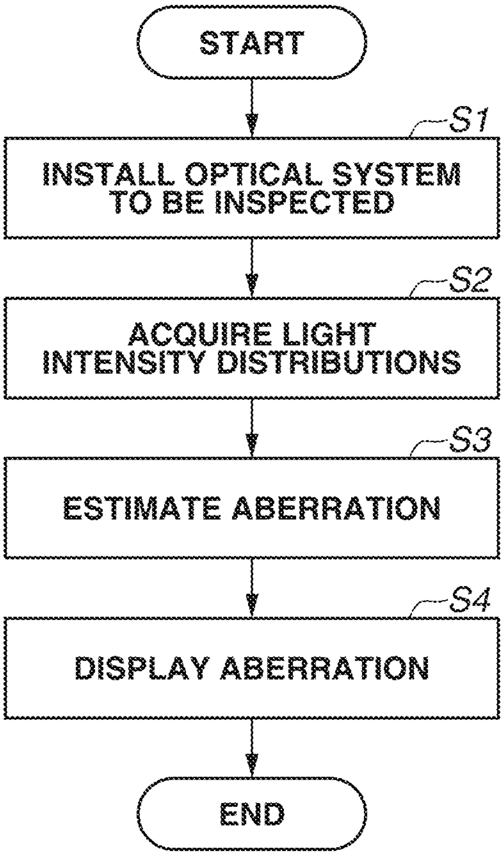
FIG. 7 is a flowchart describing an aberration estimation method according to the first exemplary embodiment.

Next, a flowchart for an aberration estimation method used by the aberration estimation apparatus 100 in each exemplary embodiment will be described with reference to FIG. 7.

In step S1, the optical system 102 is installed such that the center of the reference light source and the image pickup element 103 have a conjugate relation. The installation of the optical system 102 is not limited thereto, and all of the plurality of light sources may be arranged to be defocused with respect to the image pickup element 103 via the optical system 102.

The light source unit 101 preferably has a configuration to be adjustable depending on the optical system 102. By driving the plurality of light sources in the optical axis direction and the direction perpendicular to the optical axis direction depending on an aperture diameter of the optical system 102 or a focal length of the optical system 102, it is possible to estimate an aberration of the optical system 102 with high accuracy. Step S1 may be performed by an operator or may be automatically performed by the aberration estimation apparatus 100.

In step S2, the aberration estimation apparatus 100 acquires respective light intensity distributions of point images focused with light emitted from the light source unit 101 via the optical system 102. In a case where the light source unit 101 is configured such that the point images are not overlapped with each other, all of the light sources are simultaneously turned ON, and respective light intensity distributions of the point images can be acquired based on one image. In a case where the overlapped point images are separated in a time division manner, it is sufficient if a light source to be turned ON is sequentially changed, and a plurality of light intensity distributions is acquired in synchronization with a timing of turning-ON. The light intensity distributions acquired in step S2 are stored in the computer 104 as appropriate.

It is also sufficient if at least the respective light intensity distributions of the point images are acquired separately, and thus the method is not limited. For example, in a case where the light sources having different wavelengths are used, all the light sources may be simultaneously turned ON, and respective light intensity distributions of the point images may be acquired from one image. In a case where the respective light intensity distributions of the point images are acquired from one image, the image may be separated into respective images corresponding to the light sources by image processing as appropriate. In a case where image processing of separating the image is performed, the image may be separated into point images based on preliminarily calibrated positions, or the center position of the point image may be calculated and each point image may be separated based on the center position. In a case where the overlapped point images are separated by the wavelengths, pixels corresponding to respective colors of a camera may be extracted.

As a method of differentiating the positions of the first and second light sources in the optical axis direction of the optical system 102 and the direction perpendicular to the optical axis direction, it is conceivable to drive the optical system 102 or the light source unit 101. However, the accuracy tends to decrease at the time of movement at high speed, and it takes time at the time of movement at low speed. Thus, when light intensity distributions of the plurality of light sources are acquired, in one embodiment, it is preferable not to drive the light source unit 101 or the optical system 102. In other words, the light source unit 101 and the optical system 102 are preferably fixed during execution of step S2.

In step S3, the computer 104 executes post-processing on the plurality of light intensity distributions acquired by separation to estimate the aberration of the optical system 102.

The calculation of estimation performed in step S3 may be executed by a transport of intensity equation, optimization, a Fourier-iterative method, machine learning, or the like.

An optical apparatus for capturing an image of a general subject, such as a camera and a telescope, basically has a reduction optical system. The optical image formed by the reduction optical system has a diffraction pattern that is finer than a pixel size of the image pickup element 103, whereby light intensity distributions in the pixels are averaged by the image pickup element 103 at the time of imaging. For this reason, the light intensity distributions acquired via the reduction optical system do not have correct optical image information. As a result, there is a possibility that the accuracy of the acquired aberration decreases.

To address this issue, there is a conceivable method of increasing an amount of defocusing of each light source with respect to the reference light source to suppress the influence from averaging with the pixels. However, as the defocusing amount of each light source with respect to the reference light source increases, the aberration estimation apparatus 100 grows in size. For this reason, in the present exemplary embodiment, it is possible to use machine learning to perform calculation of estimating the aberration. By executing the calculation of estimation using machine learning, it is possible to maintain estimation accuracy even in a case where the amount of defocusing of each light source with respect to the reference light source is small and the number of light sources is small. That is, it is possible to implement estimation of the aberration with high accuracy while maintaining the aberration estimation apparatus 100 to be small.

In one embodiment, the calculation of estimation using machine learning makes it possible to perform correction processing to correct the influence by vignetting and aberrations that are changed due to a difference in relative object heights of the light sources.

For example, in a case where a multi-layer neural network is used as machine learning, the neural network is optimized by datasets of preliminarily prepared point images and aberration coefficients, whereby parameters such as weights and biases that constitute the neural network are acquired. With such a configuration, the multi-layer neural network in the present exemplary embodiment is capable of using divided images indicating light intensity distributions of the light sources as input data to output a coefficient when a wave aberration of the optical system 102 is developed to a Zernike coefficient. Furthermore, when parameters for the network are optimized, data for learning that is prepared in consideration of a change in light intensity distributions due to the influence by vignetting and aberrations that are changed due to a difference in relative object heights of the light sources is used.

In step S4, the display unit 105 displays the acquired aberration and the like.

With use of the aberration estimation method with such a configuration, in one embodiment of the disclosure is directed to estimation of the aberration of the optical system with high accuracy in a short period of time based on the plurality of light intensity distributions.

Figure 8:
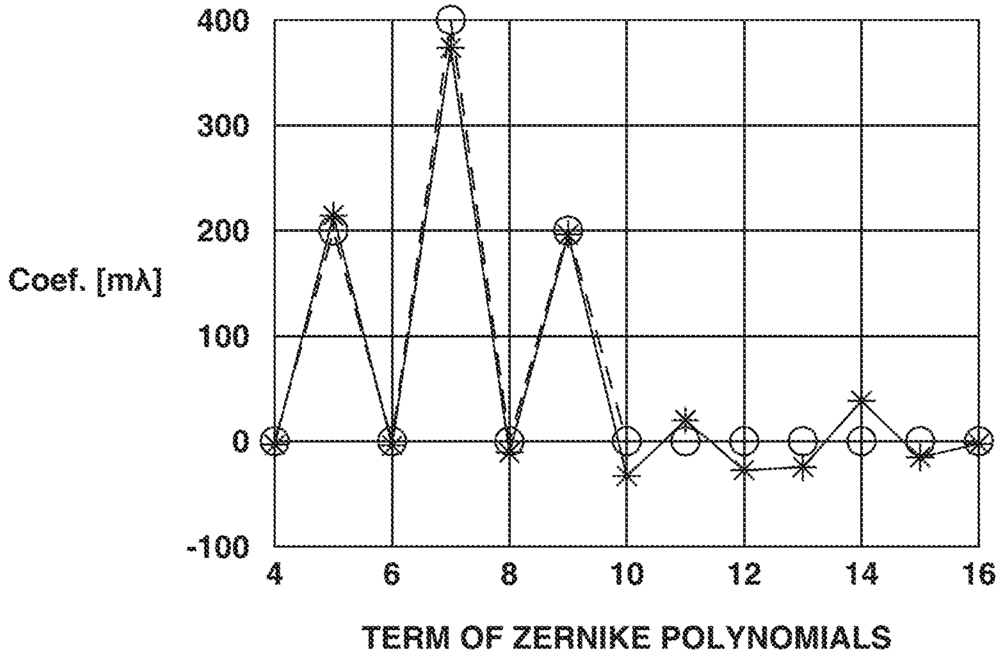
FIG. 8 is a graph indicating an estimation result.

Next, the aberration acquired by the method according to the first exemplary embodiment will be now described with reference to FIG. 8. FIG. 8 illustrates an example of the aberration estimated with use of the aberration estimation apparatus 100.

In FIG. 8, the aberration is indicated as a coefficient developed by the Fringe Zernike polynomials. In FIG. 8, a broken line indicates a true aberration amount of the optical system 102, and a solid line indicates an aberration obtained by the present exemplary embodiment. It is possible to acquire the true aberration amount using simulation or the like. In FIG. 8, the solid line reproduces the broken line with high accuracy, and the aberration estimation apparatus 100 according to the present exemplary embodiment has been able to acquire the aberration of the optical system 102 with high accuracy.

Figure 9:
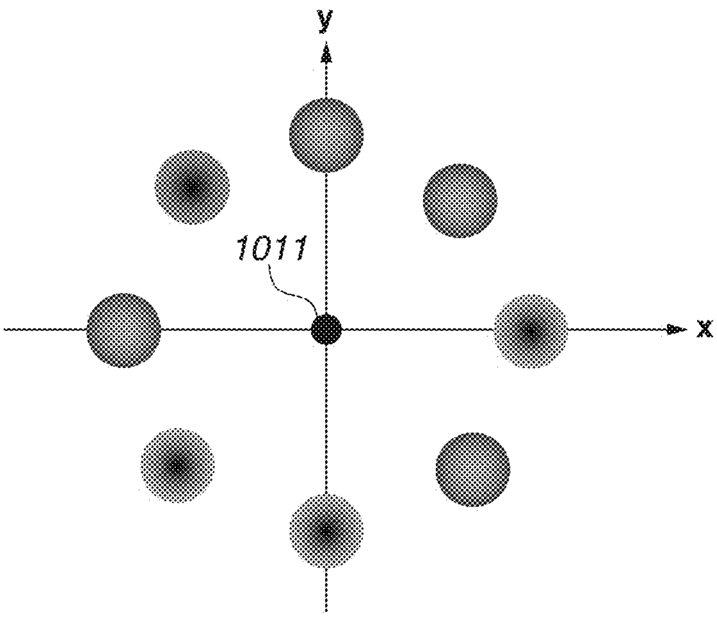
FIG. 9 is a schematic diagram illustrating arrangement of a plurality of light sources according to a second exemplary embodiment.

Subsequently, an aberration estimation apparatus 100 according to a second exemplary embodiment will now be described. A configuration of the aberration estimation apparatus 100 in the present exemplary embodiment is similar to that of the first exemplary embodiment except for a light source unit 101. A description will now be given of a configuration of the light source unit 101 according to the present exemplary embodiment with reference to FIG. 9. FIG. 9 is a diagram illustrating that the respective positions of the light sources are projected on a plane that passes through the reference light source and that is perpendicular to the optical axis.

The light source unit 101 in the present exemplary embodiment is composed of the reference light source (light source) 1011 and a peripheral light source group composed of eight light sources. In FIG. 9, each light source included in the peripheral light source group is indicated by a circle larger than a circle indicating the reference light source to express a difference in installation position in the optical axis direction. Furthermore, to express a difference between positive defocusing and negative defocusing, a light source that is positively defocused on object side is indicated by a circle whose central portion has a dark color, and a light source that is negatively defocused on the object side is indicated by a circle whose central portion has a light color.

In the present exemplary embodiment, the light sources in the peripheral light source group are arranged at every 45°. Such a configuration is favorable in that it enables reduction of the influence of the above-mentioned aberration with high accuracy. Among the peripheral light source group, four light sources are positively defocused and the remaining four light sources are negatively defocused. In this manner, the light sources of the peripheral light source group are preferably arranged so that an amount of positive defocusing and an amount of negative defocusing become approximately equal.

Figure 10:
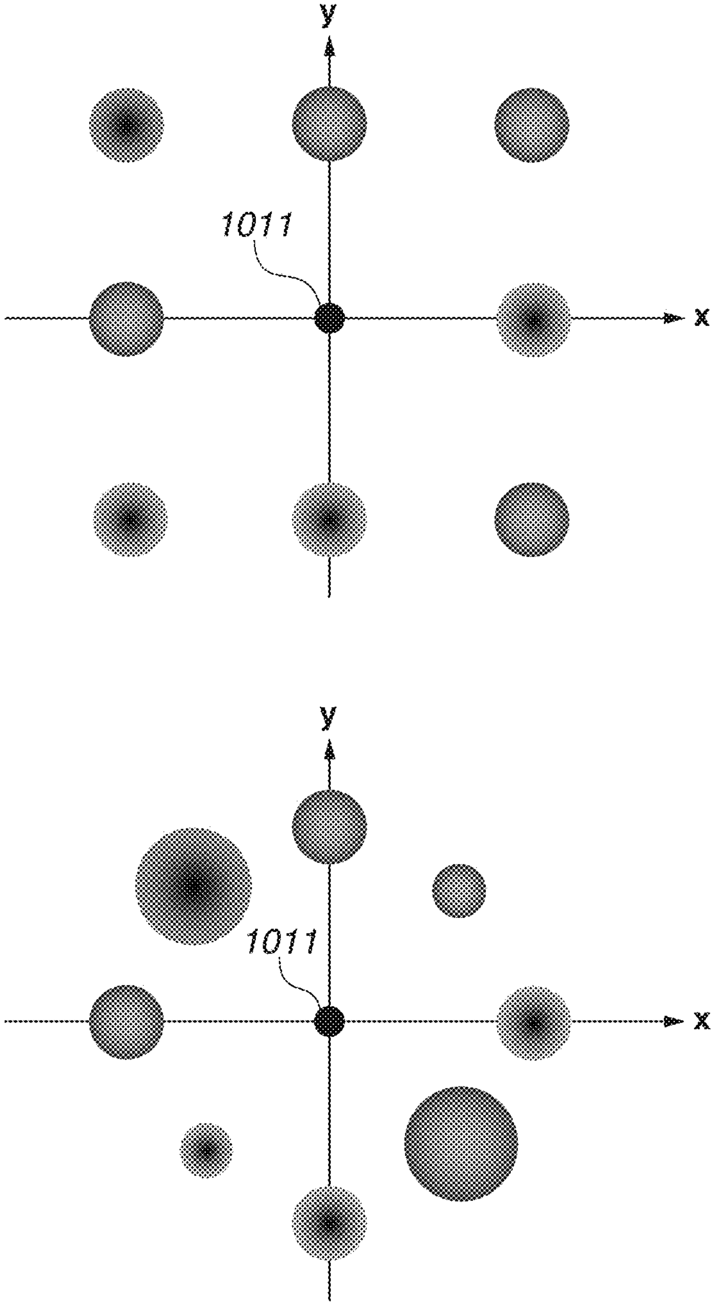
FIG. 10 illustrates schematic diagrams each illustrating a modification of arrangement of the plurality of light sources according to the second exemplary embodiment.

A modification of the second exemplary embodiment will now be described with reference to FIG. 10 top and 10 bottom. FIG. 10 top and 10 bottom are diagrams each illustrating that the respective positions of the light sources are projected on a plane that passes through the reference light source and that is perpendicular to the optical axis. FIG. 10 top is different from FIG. 9 in that, among the peripheral light source group, light sources arranged at different object heights are included. In FIG. 10 bottom, to express a difference in absolute value of a defocusing amount, a light source that is defocused on the object side at a larger amount is indicated by a larger circle. FIG. 10 bottom is different from FIG. 9 in that, among the peripheral light source group, light sources arranged at different defocusing positions are included.

The configurations as illustrated in FIG. 10 top and 10 bottom are used in enabling estimation that is robust against a change in image height or a change in defocusing. While the description has been given of the example of arranging the light sources so that only object heights are differentiated or only defocusing is differentiated among the peripheral light source group with reference to FIG. 10 top and 10 bottom, the configuration is not limited thereto. The light sources in the light source unit 101 may be arranged by a combination of FIG. 10 top and 10 bottom.

Figure 11:
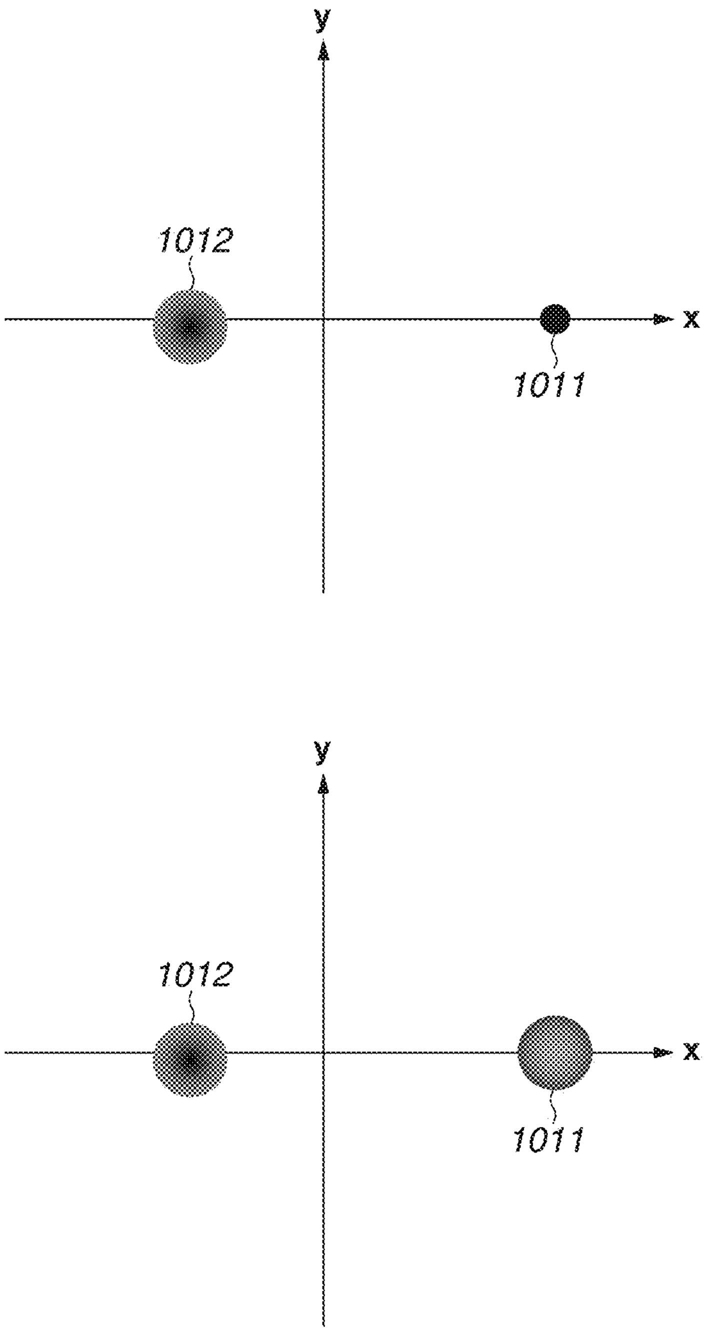
FIG. 11 illustrates schematic diagrams each illustrating arrangement of a plurality of light sources according to a third exemplary embodiment.

An aberration estimation apparatus 100 according to a third exemplary embodiment will now be described. A configuration of the aberration estimation apparatus 100 in the present exemplary embodiment is similar to that of the first exemplary embodiment except for a light source unit 101. A description will now be given of the light source unit 101 according to the present exemplary embodiment with reference to FIG. 11 top and 11 bottom. FIG. 11 top and 11 bottom are diagrams each illustrating that the respective positions of the light sources are projected on a plane that passes through the reference light source and that is perpendicular to the optical axis.

The light source unit 101 in the present exemplary embodiment is composed of the light source (reference light source) 1011 and the light source 1012. In FIG. 11 top, to express a difference in installation positions in the optical axis direction, the light source included in the peripheral light source group is indicated by a circle larger than a circle indicating the reference light source. In FIG. 11 top, the light source (first light source) 1011 and the light source (second light source) 1012 are different from each other in positions in the optical axis direction of the optical system 102 and in the direction perpendicular to the optical axis direction. Even if the reference light source is arranged at a position outside the optical axis as illustrated in FIG. 11 top, it is possible to estimate the aberration of the optical system 102. At this time, two light sources are preferably arranged on a straight line including the optical axis as illustrated in FIG. 11 top. With such a configuration, it is possible to reduce the influence caused by various aberrations when the aberrations are obtained.

In FIG. 11 bottom, to express a difference between an amount of positive defocusing and an amount of negative defocusing, a light source that is positively defocused on the object side is indicated by a circle whose central portion has a dark color, and a light source that is negatively defocused on the object side is indicated by a circle whose central portion has a light color. In comparison with FIG. 11 top, FIG. 11 bottom is different from the first exemplary embodiment in that the light source 1011 is defocused by an amount of negative defocusing on the object side. In FIG. 11 bottom, a position on the optical axis between the light source 1011 and the light source 1012 (intersection between x and y) is in a conjugate relationship with the image pickup element 103 via the optical system 102. By arranging the light sources that are defocused by amounts of object-side defocusing with mutually different signs at opposite positions with respect to a conjugate point in this manner, it is possible to acquire the aberration with high accuracy.

While the description has been given of the exemplary embodiments of the disclosure, the disclosure is not limited to these exemplary embodiments and can be modified or changed in various manners without departing from the scope of the disclosure.

A modification of the exemplary embodiments will now be described with reference to FIG. 12. While the description has been given of the example in which an optical element is not arranged between the light source unit 101 and the optical system 102 in the first to third exemplary embodiments, the configuration is not limited thereto. For example, an element (optical path change element) that changes a traveling direction of light such as a mirror and a beam splitter or an optical element including a lens may be arranged on an optical path.

Figure 12:
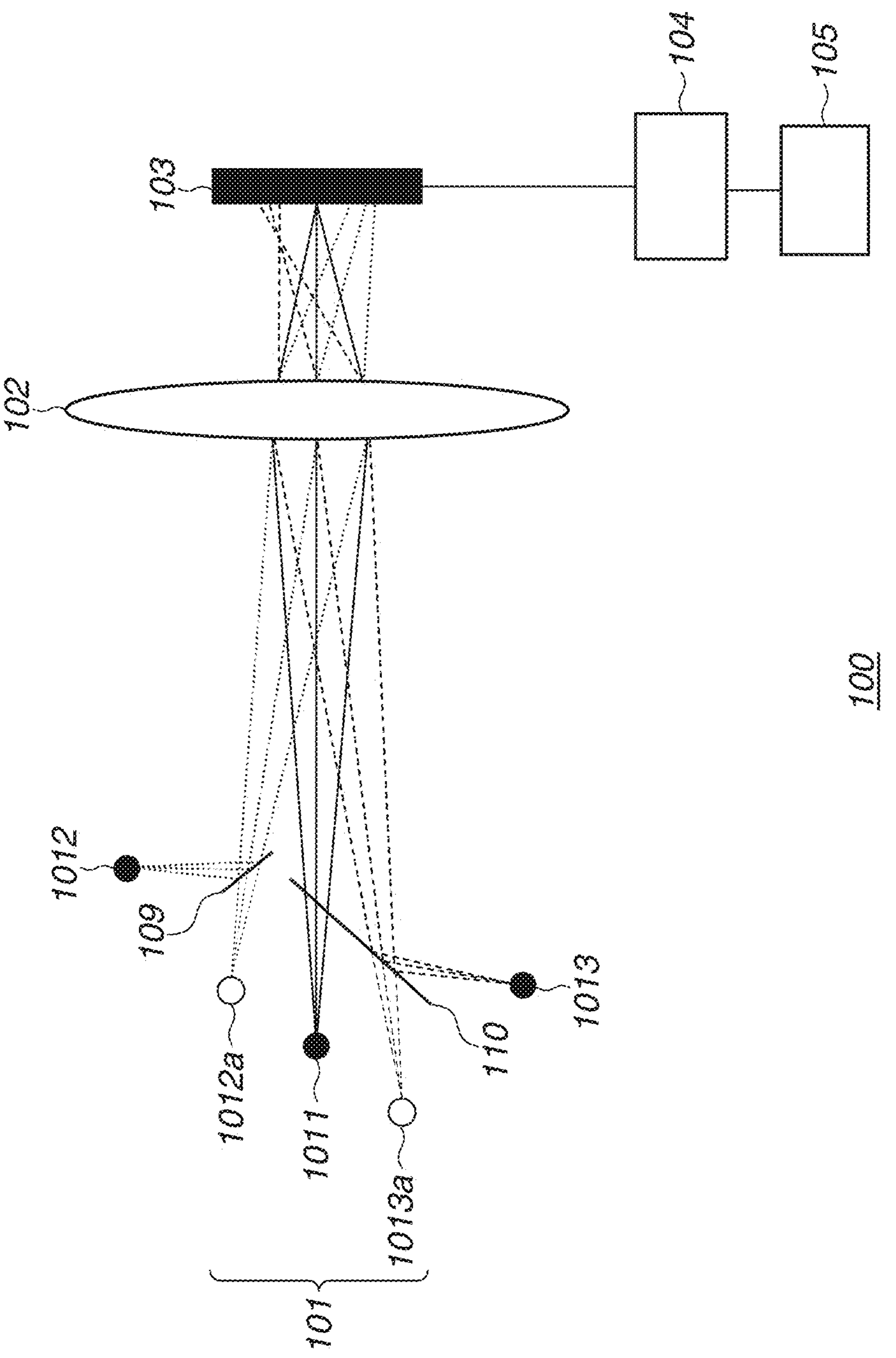
FIG. 12 is a schematic diagram illustrating an aberration estimation apparatus according to a modification.

The light source unit 101 in the aberration estimation apparatus 100 in FIG. 12 has a configuration in which a mirror 109 and a beam splitter 110 are arranged. Light emitted from the light source 1012 is guided to the optical system 102 via the mirror 109. Additionally, light emitted from the light source 1013 is guided to the optical system 102 via the beam splitter 110. Here, positions **1012*a* and 1013*a* in FIG. 12 indicate positions of virtual light sources formed of light rays extended from light rays from the optical system 102 (or the image pickup element 103) side when the optical path change element is absent. When the optical path change element is present on the optical path, the aberration estimation apparatus 100 is to have the features described in each exemplary embodiment on the assumption that the light sources are present at the positions 1012*a* and 1013*a*** of the virtual light sources in order to obtain a similar effect.

While Conditional Expression (2) is used as a condition for avoiding overlapping of spreads of a plurality of point images, a method of avoiding overlapping of spreads of the plurality of point images is not limited thereto. For example, a timing of turning-ON of each light source may be changed and an image may be acquired in step with the timing. Even with this configuration, it is possible to shorten processing time in comparison with a case of using a driving device. In this case, the aberration estimation apparatus 100 may have an output control unit that changes output of each light source over time.

It is also possible to separate respective images corresponding to the light sources by arranging light sources with different wavelengths, using a color camera as the image pickup element 103, and extracting respective images corresponding to the wavelengths by calculation processing from the acquired image. At this time, aberrations are different among point images due to different wavelengths, and thus the aberration estimation apparatus 100 executes processing to correct the difference in wavelengths in the estimation calculation.

The description has been given of the case where the reference light source is on the optical axis (or in the vicinity of the optical axis) of the optical system to be inspected in the present exemplary embodiment for ease of explanation. However, the configuration is not limited thereto. Even if the reference light source is arranged outside the optical axis of the optical system 102, respective effects of the exemplary embodiments can be provided. In one embodiment, the center of at least one of the plurality of light sources is to be in a substantially conjugate relation with the image pickup element 103 due to the optical system 102.

In each exemplary embodiment, the optical axis of the optical system 102 is used as a reference axis when a consideration is given to restrictions on the arrangement. However, in a case where the reference light source is outside the optical axis, a straight line that connects the reference light source and the optical system 102 can be considered as the reference axis.

In each exemplary embodiment, an image to be used for calculation of estimating the aberration is to be formed with light from a light source, and all the light sources (or substantially point light sources) that constitute the light source unit 101 are not necessarily point light sources. For example, the aberration estimation apparatus 100 may include a light source that measures an installation position of the optical system 102.

The disclosure can also be implemented by installation of a program that implements one or more functions of the above-mentioned exemplary embodiments in a system or an apparatus through a network or a storage medium, and loading and execution of processing of the program by one or more processors in the system or a computer of the apparatus. Furthermore, the disclosure can also be implemented by a circuit (e.g., an application specific integrated circuit (ASIC)) that implements one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-205718, filed Dec. 5, 2023, which is hereby incorporated by reference herein in its entirety.

What is claimed is:

1. An apparatus comprising:

a light source unit including a first light source and a second light source that are configured to illuminate an optical system; and an estimation unit configured to estimate an aberration of the optical system based on respective light intensity distributions of the first light source and the second light source obtained via the optical system, wherein positions of the first light source and a positions of the second light source are different from each other in an optical axis direction of the optical system and in a direction perpendicular to the optical axis direction.

2. The apparatus according to claim 1, wherein the aberration is a wavefront aberration.

3. The apparatus according to claim 1, wherein the following conditional expression is satisfied:

$$640000 \leq |\Delta z\min|/\lambda,$$

where Δzmin is a minimum amount of a distance between centers of the first and second light sources in the optical axis direction, and λ is a wavelength of each light source.

4. The apparatus according to claim 1, wherein, when the first light source and the second light source are projected on a plane that is perpendicular to the optical axis, the following conditional expression is satisfied:

$$30° \leq \varphi,$$

where φ[°] is an angle formed by a line segment that connects the first light source and the optical axis and a line segment that connects the second light source and the optical axis.

5. The apparatus according to claim 1, the following conditional expression is satisfied:

$$5.2 \leq \theta \leq 174.8,$$

where θ[°] is an angle formed by a line segment that connects a center of the first light source and a center of the second light source and the optical axis.

6. The apparatus according to claim 1, wherein the estimation unit is configured to use a multi-layer neural network to estimate the aberration based on respective light intensity distributions of the first light source and the second light source.

7. The apparatus according to claim 1, wherein the estimation unit is configured to estimate the aberration based on a change in light intensity distributions, the change being caused by a difference between a position of the first light source and a position of the second light source.

8. The apparatus according to claim 1, wherein the first light source and the second light source have different wavelengths from each other.

9. A method of estimating an aberration of an optical system, the method comprising:

illuminating the optical system with light emitted from a first light source and light emitted from a second light source to acquire light intensity distributions of the first light source and the second light source via the optical system; and estimating the aberration based on the light intensity distributions, wherein the first light source and the second light source are different from each other in positions in an optical axis direction of the optical system and in a direction perpendicular to the optical axis direction.

10. The method according to claim 9, wherein the acquiring includes arranging a center of at least one of the first light source and the second light source and a receiving unit configured to acquire the light intensity distributions, in a conjugate relation via the optical system.

11. The method according to claim 10, wherein, when a defocusing amount of defocusing from an object side to an image side is a positive defocusing amount, the first light source is imaged at a position defocused by a positive defocusing amount with respect to the receiving unit by the optical system, and the second light source is imaged at a position defocused by a negative defocusing amount with respect to the receiving unit due to the optical system.

12. The method according to claim 11, wherein the following conditional expression is satisfied:

$$640000 \leq |\Delta z\min|/\lambda,$$

where Δzmin is a minimum amount of a distance between centers of the first and second light sources in the optical axis direction, and λ is a wavelength of each light source.

13. The method according to claim 11, wherein, when the first light source and the second light source are projected on a plane that is perpendicular to the optical axis, the following conditional expression is satisfied:

$$30° \leq \varphi,$$

where φ[°] is an angle formed by a line segment that connects the first light source and the optical axis and a line segment that connects the second light source and the optical axis.

14. The method according to claim 11, the following conditional expression is satisfied:

$$5.2 \leq \theta \leq 174.8,$$

where θ[°] is an angle formed by a line segment that connects a center of the first light source and a center of the second light source and the optical axis.

15. A non-transitory storage medium configured to store a program that causes a computer to execute the method of estimating an aberration of an optical system, the method comprising:

illuminating the optical system with light emitted from a first light source and light emitted from a second light source to acquire light intensity distributions of the first light source and the second light source via the optical system; and estimating the aberration based on the light intensity distributions, wherein the first light source and the second light source are different from each other in positions in an optical axis direction of the optical system and in a direction perpendicular to the optical axis direction.

16. The storage medium according to claim 15, wherein the acquiring includes arranging a center of at least one of the first light source and the second light source and a receiving unit configured to acquire the light intensity distributions, in a conjugate relation via the optical system.

17. The storage medium according to claim 16, wherein, when a defocusing amount of defocusing from an object side to an image side is a positive defocusing amount, the first light source is imaged at a position defocused by a positive defocusing amount with respect to the receiving unit by the optical system, and the second light source is imaged at a position defocused by a negative defocusing amount with respect to the receiving unit due to the optical system.

18. The storage medium according to claim 15, wherein the following conditional expression is satisfied:

$$640000 \leq |\Delta z\text{min}|/\lambda,$$

where Δzmin is a minimum amount of a distance between centers of the first and second light sources in the optical axis direction, and λ is a wavelength of each light source.

19. The storage medium according to claim 15, wherein, when the first light source and the second light source are projected on a plane that is perpendicular to the optical axis, the following conditional expression is satisfied:

$$30° \leq \varphi,$$

where φ[°] is an angle formed by a line segment that connects the first light source and the optical axis and a line segment that connects the second light source and the optical axis.

20. The storage medium according to claim 15, the following conditional expression is satisfied:

$$5.2 \leq \theta \leq 174.8,$$

where θ[°] is an angle formed by a line segment that connects a center of the first light source and a center of the second light source and the optical axis.

* * * * *